United States Patent [19]

Ogihara et al.

[11] Patent Number: 5,234,315

[45] Date of Patent: Aug. 10, 1993

[54] APPARATUS FOR PREVENTING A TURBINE FROM EXCEEDING REVOLUTION SPEED

[75] Inventors: Kunihiro Ogihara, Hitachi; Hideaki Kaneda, Katsuta, both of Japan

[73] Assignee: Hitachi, Ltd., Tokyo, Japan

[21] Appl. No.: 851,954

[22] Filed: Mar. 16, 1992

[30] Foreign Application Priority Data

Mar. 19, 1991 [JP] Japan .................... 3-054335

[51] Int. Cl.$^5$ .................... G01M 15/00; F01D 21/02
[52] U.S. Cl. .................... 415/16; 415/30; 364/431.02; 364/507; 364/508; 364/565
[58] Field of Search .................... 415/1, 16, 30; 364/431.02, 507, 508, 565

[56] References Cited

U.S. PATENT DOCUMENTS

| | | | |
|---|---|---|---|
| 4,303,369 | 12/1981 | Hisano et al. | 415/1 |
| 4,454,754 | 6/1984 | Zagranski et al. | 364/431.02 |
| 4,984,173 | 1/1991 | Imam et al. | 364/565 |
| 5,038,616 | 8/1991 | Schneider et al. | 364/508 |

FOREIGN PATENT DOCUMENTS

| | | | |
|---|---|---|---|
| .7710 | 1/1984 | Japan | 415/16 |
| 49108 | 3/1986 | Japan | 415/16 |

OTHER PUBLICATIONS

Japanese Patent Unexamined Publication No. 57-113912.

Primary Examiner—Edward K. Look
Assistant Examiner—Michael S. Lee
Attorney, Agent, or Firm—Antonelli, Terry, Stout & Kraus

[57] ABSTRACT

An apparatus comprises a first rotational speed detecting device provided on a stub shaft at a position closer to a turbine than a pump, a second revolution speed detecting device provided at the other end of the stub shaft, a comparator for continuously comparing values detected by these first and second rotational speed detecting devices, and a device for tripping the turbine when a difference is determined between the values compared by the comparator.

2 Claims, 3 Drawing Sheets

APPARATUS FOR PREVENTING A TURBINE FROM EXCEEDING REVOLUTION SPEED

FIELD OF THE INVENTION

The present invention relates to an apparatus for preventing a turbine from operating at an excessive rotational speed, with the apparatus including a stub shaft provided at an end of a shaft of a turbine rotor, a main oil pump, and a governor which are mounted on the stub shaft.

BACKGROUND OF THE INVENTION

In general, a rotor of a steam turbine is provided at a tip end thereof with a stub shaft on which a main oil pump, a safety governor, and a main governor for controlling a rotational speed of the turbine are mounted. The main oil pump serves to drive a valve for controlling an amount of steam flowing into the turbine as well as to circulate a lubricant through a rotary portion of the turbine. Generally, the main oil pump is disposed at a position most adjacent to the turbine. In this type of turbine, if the stub shaft is broken between the safety governor and the main oil pump the main governor, provided at the end of the stub shaft, reacts as if the rotational speed of the turbine is reduced, and then issues an opening command to a control valve. By virtue of the issuance of an opening command to the control valve with a broken stub shaft, the possibility exists that a greater amount of steam than necessary is allowed to flow into the turbine so as to cause the turbine to operate at an excessive rotational speed, thereby bringing about a serious accident such as, for example, a destruction of the turbine blades.

In order to prevent the occurrence of an accident of the aforementioned type, in, for example, Japanese Patent Unexamined Publication No. 57-113912, an apparatus is provided for detecting a breakage of the stub shaft, with the apparatus including an electromagnetic pick-up provided at the end of the stub shaft. When a signal issued from the electromagnetic pick-up indicates a reduction in the rotational speed and a 10 signal from a device for detecting a main oil pump discharge pressure indicates the rated discharge pressure, the turbine is immediately tripped.

In the above noted conventional apparatus, since the main oil pump discharge pressure and the rated oil pressure are compared with each other, it is possible to detect the breakage of the stub shaft during operation at rotational speed approximately corresponding to the rated rotation speed of the turbine. However, when the turbine is operated at rotational speeds less than the rated rotational speed when, for example, the rotational speed is increased and decreased, it is impossible to detect the breakage of the stub shaft.

SUMMARY OF THE INVENTION

The aim underlying the present invention essentially resides in providing an apparatus which is capable of detecting a breakage of a stub shaft during the operation of a turbine under any condition, that is, at every rotational speed such as when the turbine is started, operated at a rated speed, or the rotational speed of the turbine is being increased and, hence, is capable of preventing the turbine from operating at an excessive rotational speed.

Another object of the present invention is to provide an apparatus which trips the turbine in an early stage before the rotational speed of the turbine is increased to the rated rotational speed when it is detected that a stub shaft is broken during operation of the turbine with the rotational speed being increased.

To this end, in accordance with the present invention, an apparatus is provided which comprises a first rotational speed detector or sensor provided on a stub shaft at a portion nearer to a turbine than a main oil pump, a second rotational speed detector or sensor provided on the stub shaft at another portion of the stub shaft on the opposite side to the first detector or sensor with respect to the main oil pump, a comparator for continuously comparing values detected by the first and second rotational speed detectors or sensors, and a device for tripping the turbine when a predetermined difference is determined between values compared by the comparator.

According to the apparatus of the present invention, since the rotational speed of the turbine rotor is continuously detected by the first and second rotational speed detectors or sensors during operation of the turbine, and since the signals from the detectors or sensors are compared with each other, it is possible to detect the breakage of the stub shaft during the operation of the turbine at every rotational speed such as when the turbine is started, operated at the rated rotational speed, or when the rotational speed of the turbine is increased.

Figure 1:
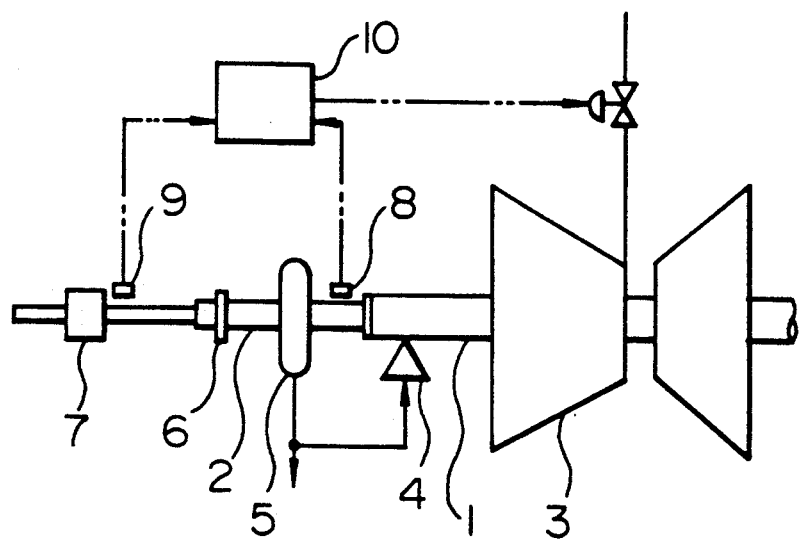
FIG. 1 is a schematic side view of an apparatus for preventing a turbine from operating at an excessive rotational speed constructed in accordance with the present invention.

DETAILED DESCRIPTION OF PREFERRED EMBODIMENTS:

Referring now to the drawings wherein like reference numerals are used throughout the various views to designate like parts and, more particularly, to FIG. 1, according to this figure, a turbine comprises a turbine rotor connected at one end to a generator (not shown) and at the other end to a stub shaft 2. The turbine rotor 1 is provided with moving blades and supported by a bearing 4. A main oil pump 5, a safety governor 6 and a main governor 7 are provided on the stub shaft 2, with the main oil pump serving to feed a lubricant to the bearing an driving pressurized oil to a control valve serving to control an inflow of steam into the turbine. For this reason, the main oil pump 5 requires the highest torque and is arranged on the stub shaft at a position nearest to the turbine rotor 1.

A rotational speed detector or sensor 8 is provided between the turbine rotor 1 and the main oil pump 5 on the stub shaft 2, and a further rotational speed detector or sensor 9 is provided in a vicinity or area of the main governor 7.

A control unit 10 compares values of rotational speeds detected or sensed by the speed detectors or sensors 8, 9 and supplies a turbine trip signal in dependence upon a result of the comparison carried out in the control unit 10. The control unit 10 cooperates with the detectors or sensors 8, 9 so as to form an excessive rotational speed detector or sensor arrangement and thus a shaft breakage detector or sensor.

Figure 2:
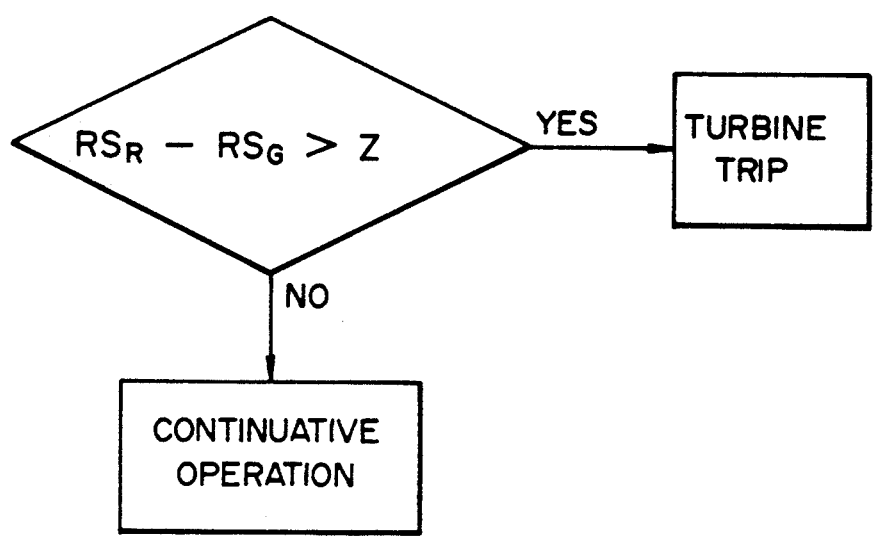
FIG. 2 is a block diagram for explaining the operation of the embodiment of FIG. 1.

The rotational speed of the turbine rotor 1 or the stub shaft 2 is continuously detected or sensed by the rotational speed detectors or sensors 8, 9 during operation of the turbine, and output signals from both of the detectors or sensors 8, 9 are compared with each other. As shown in FIG. 2, when a difference between the rotational speed $RS_R$ of the stub shaft 2 and the side of the turbine rotor and a rotational speed $RS_G$ of the stub shaft on the main governor side is greater than a threshold value Z, the control unit 10 issues a turbine trip signal to operate a turbine trip mechanism, namely, a signal to close a valve (not shown) through which steam is supplied to the turbine.

Figure 3:
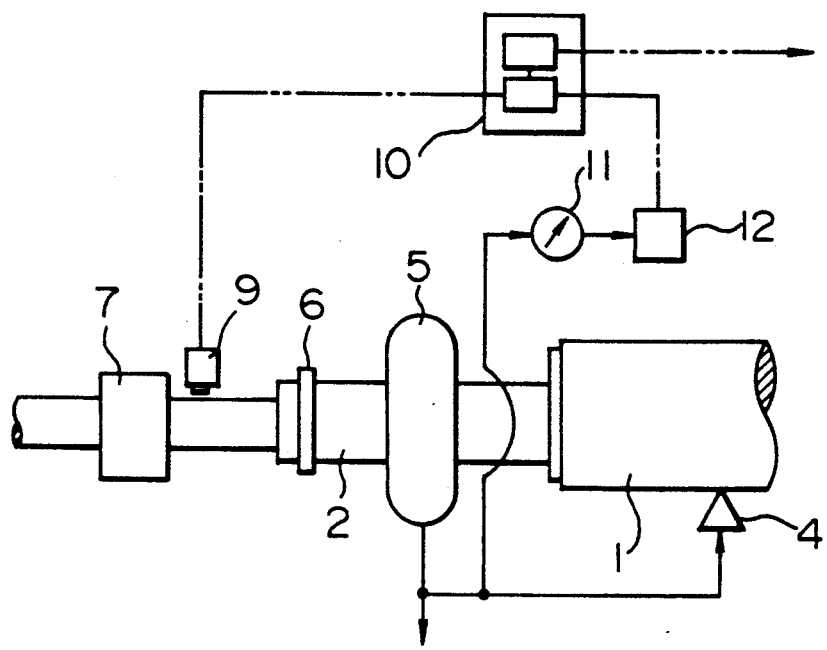
FIG. 3 is a schematic side view of an apparatus for preventing a turbine from operating at an excessive rotational speed according to another embodiment of the present invention.

The rotational speed detector or sensors 8, 9 may, for example, be adapted to directly detect or sense the rotational speed; however, other types of detectors or sensors may be employed. For example, it is possible to obtain the rotational speed with an arrangement such as shown in FIG. 3. More particularly, in order to detect or sense the rotational speed of the stub shaft 2 on the rotor side, a main oil pump discharge pressure gauge 11 and a converter 12 may be provided with the converter 12 converting the discharge pressure of the main oil pump 5 into a rotational speed. A breakage of the stub shaft 2 is detected in the manner described hereinabove in connection with FIG. 2 using the rotational speeds from the speed detector or sensor 9 and the converter 12, and, if necessary, the turbine is tripped upon the occurrence of excessive rotational speeds. The embodiment of FIG. 3 is effective particularly when there is no space in the turbine for installation of the rotor-side rotational speed detector or sensor 8 of FIG. 1.

Figure 4:
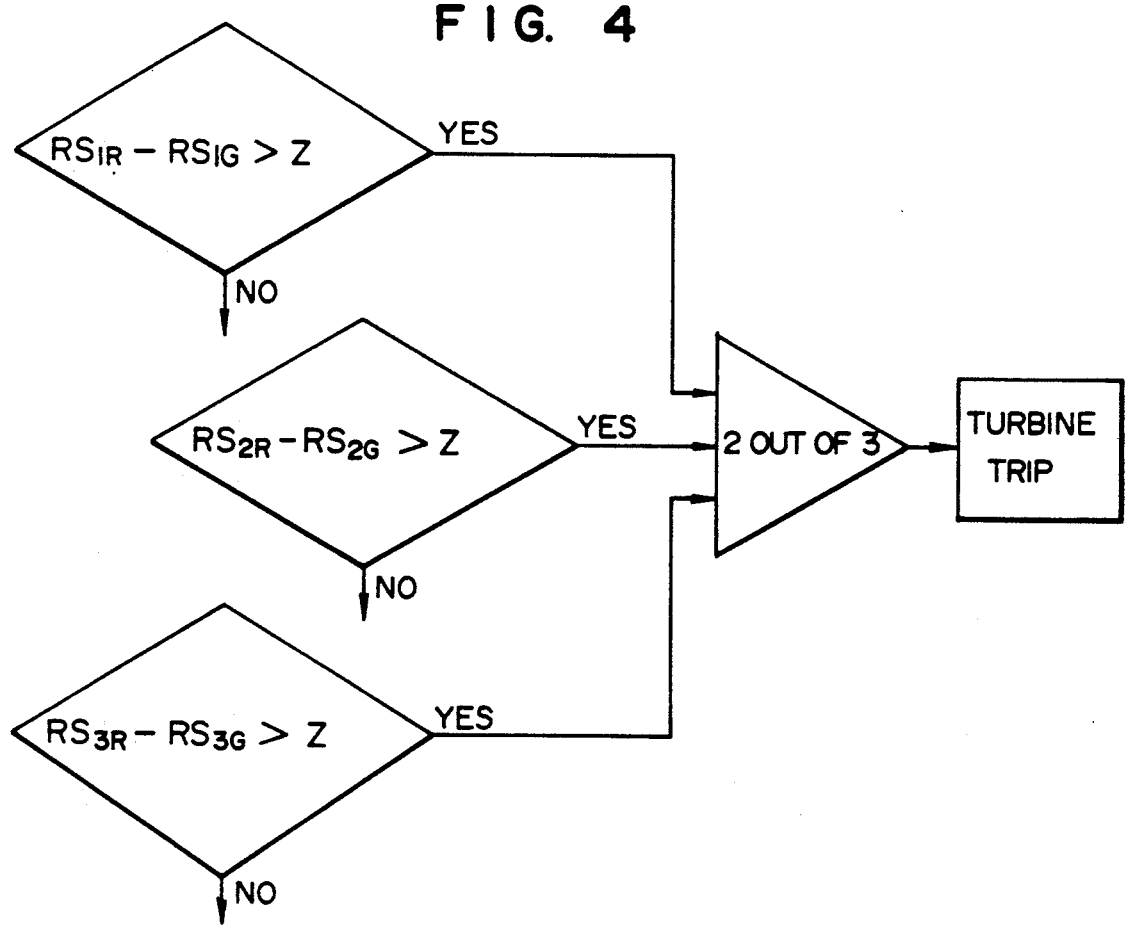
FIGS. 4 and 5 are block diagrams for explaining the operation of other embodiments of the present invention.

In the embodiment of FIG. 4, multiple circuits, for example, three circuits, are employed for comparing the detected or sensed rotational speed. A decision by a majority of, for example, two out of three of the circuits, based on the results of comparison contributes to the prevention of the turbine trip due to a malfunction of the detector or sensor, thereby making it possible to improve the reliability of the overall system.

Figure 5:
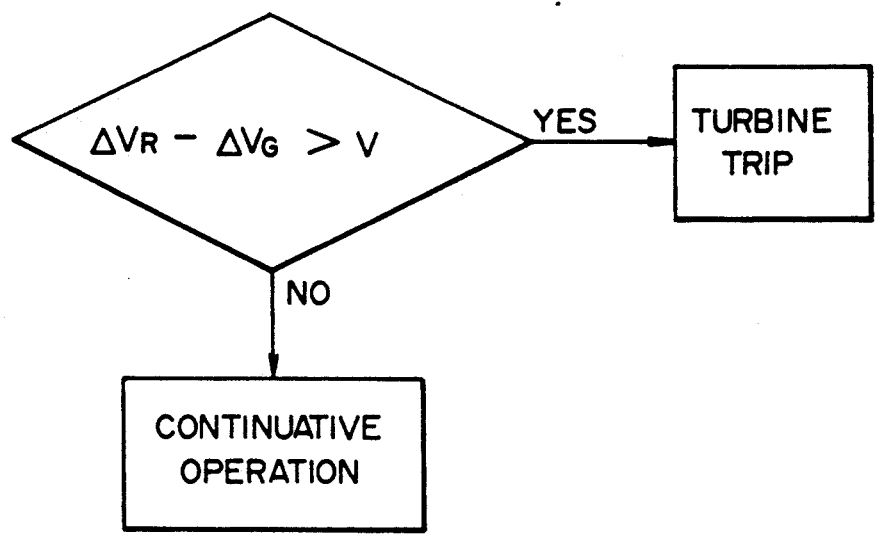

In the embodiment of FIG. 5 the rotational speed detector or sensors 8, 9 are used and, when a difference between a change $\Delta V_R$ of the rotational speed detected or sensed by the rotor-side rotational speed detector or sensor 8 and a change $\Delta V_G$ of the rotational speed detected or sensed by the governor side rotational speed detector or sensor 9 is greater than a predetermined threshold value, it is judged that the stub shaft 2 is broken and, consequently, the turbine is tripped.

Figure 6:
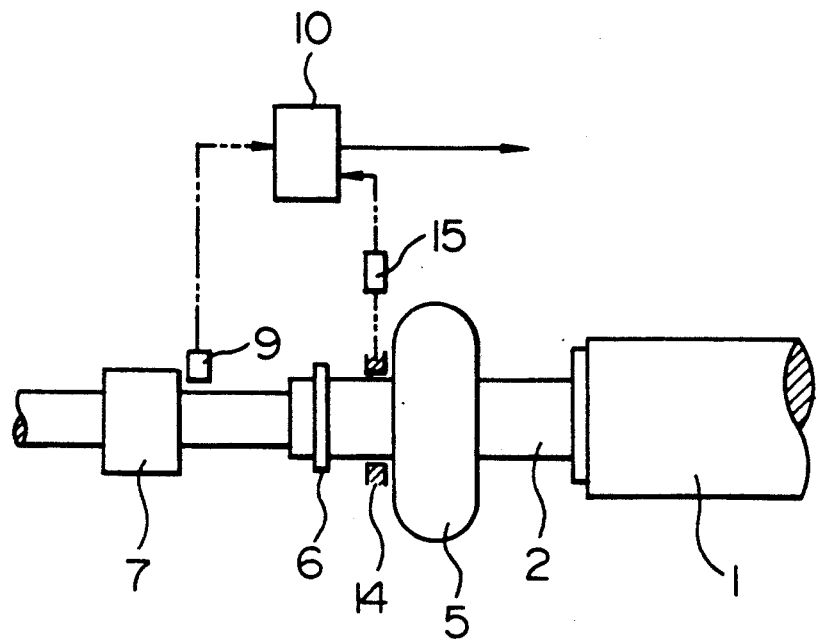
FIG. 6 is a side view of a further embodiment of the present invention.

A breakage of the stub shaft 2 causes the turbine rotor 1 and the stub shaft 2 to become unbalanced resulting in an increase in a vibration of a bearing 14 for the main oil pump. In the embodiment of FIG. 6, the vibration of the bearing 14 is converted into rotational speed in advance.

When a difference between a rotational speed corresponding to the vibration of the bearing 14 is detected or sensed by a vibration detector 15 and a rotational speed detected or sensed by the rotational speed detector or sensor 9 exceeds a predetermined threshold value $W(\mu)$, it is judged that the stub shaft 2 is broken and the turbine is tripped.

While the above description refers to a comparison of the rotational speeds alone, it is also possible for a function of the rotational speed to be used for comparison.

As described above, according to the present invention, it is possible to detect the breakage of the stub shaft 2 at any rotational speed of the turbine throughout the entire operational range of the turbine from a starting to a stopping of the turbine so that is possible to prevent the turbine from operating at an excessive rotational speed.

What is claimed is:

1. An apparatus for preventing a turbine from operating at an excessive rotational speed, the apparatus comprising a stub shaft connected to an end of a turbine shaft, and an oil pump and governor provided on said stub shaft, a detector arrangement for detecting an abnormality of said stub shaft, and a control unit for tripping said turbine in dependence upon a trip command signal, wherein said detector arrangement includes a first rotational speed detector provided at one end of said stub shaft adjacent to said turbine shaft and a second rotational speed detector provided at an opposite end of said stub shaft, said control unit is adapted to continuously compare values detected by said first and second rotational speed detectors and issue the trip command signal when the difference in rotational speeds is determined between the rotational speed detected by said first and second detectors, and wherein said first rotational speed detector includes means for measuring vibration of a bearing of said oil pump, and means for converting a value measured by said vibration measuring device into a rotational speed of said turbine shaft.

2. An apparatus for preventing a turbine from operating at an excessive rotational speed, the apparatus comprising a stub shaft provided at an end of a turbine shaft, and a main governor, an oil pump, a safety governor and an excessive speed detector means provided on said stub shaft, said apparatus being adapted to trip said turbine in dependence upon a trip command signal from said excessive speed detector means when the stub shaft is broken, wherein said excessive speed detector means includes at least two of rotational speed detectors are provided at opposite ends of said stub shaft, and a control unit for comparing rotational speeds detected by each pair of rotational speed detectors and issuing said trip command signal only when a difference is determined between the rotational speeds of more than one-half of the pairs of rotational speed detectors.

* * * * *